United States Patent
Ibuki et al.

(10) Patent No.: US 9,621,095 B2
(45) Date of Patent: Apr. 11, 2017

(54) METHOD FOR DRIVING LINEAR ACTUATOR

(75) Inventors: Yasuo Ibuki, Suzhou (CN); Takafumi Ohba, Shiga (JP); Kazunori Watanabe, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 61 days.

(21) Appl. No.: 13/976,269

(22) PCT Filed: Jan. 19, 2012

(86) PCT No.: PCT/JP2012/051020
§ 371 (c)(1),
(2), (4) Date: Jun. 26, 2013

(87) PCT Pub. No.: WO2012/099183
PCT Pub. Date: Jul. 26, 2012

(65) Prior Publication Data
US 2013/0285578 A1 Oct. 31, 2013

(30) Foreign Application Priority Data
Jan. 21, 2011 (JP) ................................. 2011-011277

(51) Int. Cl.
*H02K 33/00* (2006.01)
*H02P 25/02* (2016.01)
*H02P 25/032* (2016.01)

(52) U.S. Cl.
CPC .......... *H02P 25/027* (2013.01); *H02P 25/032* (2016.02)

(58) Field of Classification Search
USPC .......................................................... 310/36
See application file for complete search history.

(56) References Cited

U.S. PATENT DOCUMENTS 5,955,799 A * 9/1999 Amaya ................. B26B 19/282
15/22.2
6,083,082 A * 7/2000 Saldana ............................ 451/5
(Continued)

FOREIGN PATENT DOCUMENTS

CN 1639956 A 7/2005
CN 101409479 A 4/2009
(Continued)

OTHER PUBLICATIONS

International Preliminary Report on Patentability issued in International Application No. PCT/JP2012/051020 with Date of mailing Jul. 23, 2013.
(Continued)

*Primary Examiner* — Bentsu Ro
*Assistant Examiner* — Cortez Cook
(74) *Attorney, Agent, or Firm* — McDermott Will & Emery LLP (57) ABSTRACT

An amplitude control unit (40) detects the amplitude of a movable element (12) that reciprocates relative to a stator (11), detects fluctuations in a load over time according to detected fluctuations over time in the amplitude, and detects an abnormality on the basis of the detected fluctuations over time in the load. The amplitude control unit (40) outputs the detected amplitudes to a control output unit (50). The control output unit (50) controls a drive current (Id) for reciprocating the movable element (12) on the basis of the amplitude information supplied from the amplitude control unit (40).

5 Claims, 7 Drawing Sheets

(56) References Cited

U.S. PATENT DOCUMENTS

| | | | |
|---|---|---|---|
| 6,351,089 B1 | 2/2002 | Ibuki et al. | |
| 7,276,866 B2 * | 10/2007 | Asano | 318/135 |
| 2004/0090146 A1 | 5/2004 | Miyazawa | |
| 2008/0078870 A1 * | 4/2008 | Kneller | B64D 11/003 244/118.5 |
| 2009/0096298 A1 | 4/2009 | Utsumi | |
| 2009/0243520 A1 * | 10/2009 | Kashiwabara et al. | 318/127 |

FOREIGN PATENT DOCUMENTS

| | | | | |
|---|---|---|---|---|
| DE | WO2011026489 | * | 10/2011 | 318/400.15 |
| JP | 63-239504 A | | 10/1988 | |
| JP | 05-084381 A | | 4/1993 | |
| JP | 06-165554 A | | 6/1994 | |
| JP | 07-281729 A | | 10/1995 | |
| JP | 7281729 A | * | 10/1995 | |
| JP | 2001-016892 A | | 1/2001 | |
| JP | 2001016892 A | * | 1/2001 | |

OTHER PUBLICATIONS

International Search Report issued in PCT/JP2012/051020, dated Apr. 17, 2012.
Japanese Office Action issued in Japanese Application No. 2011-011277, dated Feb. 17, 2015.
Chinese Office Action and Search Report issued in Chinese Application No. 201280004465.3, dated Jan. 30, 2015, with English translation of Search Report.

* cited by examiner

METHOD FOR DRIVING LINEAR ACTUATOR

RELATED APPLICATIONS

This application is the U.S. National Phase under 35 U.S.C. §371 of International Application No. PCT/JP2012/051020, filed on Jan. 19, 2012, which in turn claims the benefit of Japanese Application No. 2011-011277, filed on Jan. 21, 2011, the disclosures of which Applications are incorporated by reference herein.

TECHNICAL FIELD

The present invention relates to a method of driving a linear actuator that reciprocates a movable element.

BACKGROUND ART

In the prior art, a known linear actuator includes a stator formed by an electromagnet, a movable element provided with a permanent magnet, and a control unit for controlling drive current that is supplied to a coil of the electromagnet. The linear actuator reciprocates and oscillates the movable element relative to the stator (refer to patent document 1). A method for detecting movement (displacement, speed, or acceleration) of the movable element by detecting the induced voltage generated at the coil of the electromagnet has been proposed for the linear actuator.

PRIOR ART DOCUMENT

Patent Document

Patent Document 1: Japanese Laid-Open Patent Publication No. 2001-16892

SUMMARY OF THE INVENTION

Problems that are to be Solved by the Invention

However, a method for detecting the occurrence of an abnormality at an early stage has not been proposed for the above linear actuator. Improvements may be made in this regard. For example, a detection value indicating the movement of the movable element described above may be used as a parameter to detect an abnormality when the detection value becomes less than or equal to a predetermined value that is set in advance. However, to detect an abnormality with such a detection value (momentary value), the predetermined value should be set to a value that may be considered as an abnormality taking into consideration component variations and the like. Thus, with such a method, early detection of an abnormality cannot be realized.

It is an object of the present invention, which has been made to solve the above problem, to provide a method of driving a linear actuator that allows for early detection of an abnormality.

Means for Solving the Problems

To solve the above problem, one aspect of the present invention provides a method of driving a linear actuator including a stator and a movable element. One of the stator and the movable element includes an electromagnet. The driving method includes detecting at least one of displacement, speed, and acceleration of the movable element to control drive current for reciprocating the movable element in accordance with the detected value, and detecting a temporal change in a load in correspondence with a temporal change in the detected value.

The above configuration preferably includes determining likeliness of a momentary change of the load to occur by detecting a number of times the detected value increases and decreases, and changing a method of controlling the movable element in accordance with the determination result.

Further, the above configuration preferably includes changing, in correspondence with the determination result, a loop gain of a feedback loop that controls the drive current.

Further, the above configuration preferably includes changing a target value of an amplitude of the movable element in correspondence with the determination result.

Further, the above configuration preferably includes during a non-conductive period in which the drive current is not flowing to a coil of the electromagnet included in one of the stator and the movable element, detecting induced voltage generated at the coil during reciprocation of the movable element to detect the detected value.

A preferred example provides a method of driving a linear actuator including a stator and a movable element that reciprocates. One of the stator and the movable element includes an electromagnet. The method includes detecting induced voltage generated at a coil of the electromagnet during reciprocation of the movable element, detecting an amplitude of the reciprocation of the movable element from the induced voltage, storing the detected amplitude, controlling a drive current for reciprocating the movable element based on at least the detected amplitude, and detecting a temporal change in a load in correspondence with a temporal change in the stored amplitude to detect an abnormality.

Effect of the Invention

The present invention allows for early detection of an abnormality.

EMBODIMENTS OF THE INVENTION

One embodiment of the present invention will now be described with reference to the drawings.

Figure 1:
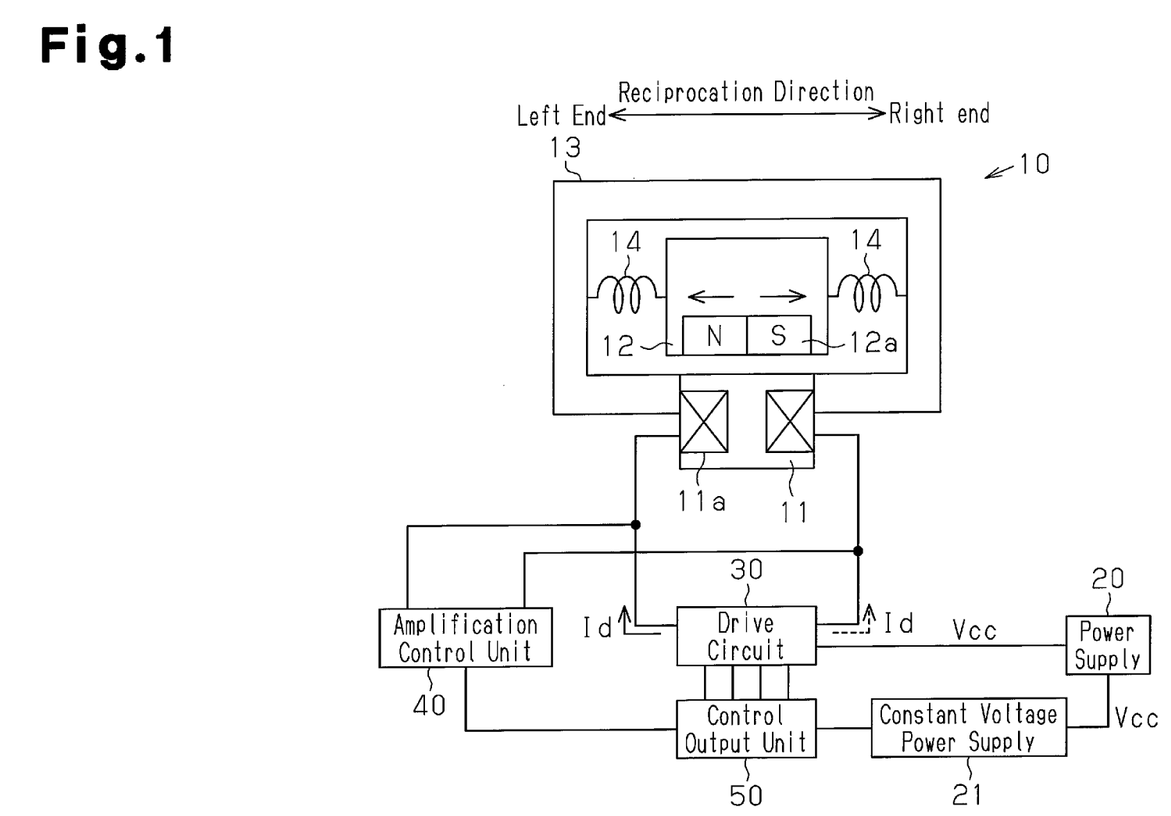
FIG. 1 is a block diagram of a linear oscillation actuator according to one embodiment of the present invention.

As shown in FIG. 1, a linear oscillation actuator 10 includes a stator 11 and a movable element 12. The stator 11 is formed by an electromagnet including a core, which is obtained by stacking magnetic sinters or magnet steel plates, and a coil 11a, which is wound around the core. The stator 11 is fixed to the frame 13.

The movable element 12 is supported by a spring 14 on the frame 13 in a manner allowing for reciprocation. The movable element 12 includes a permanent magnet 12a arranged opposing the stator 11 with a predetermined gap formed in between. Further, the permanent magnet 12a is magnetized in the reciprocation direction of the movable element 12 (sideward direction in the drawing).

An example of the electric configuration for driving the linear oscillation actuator 10 will now be described.

A drive circuit 30 connected to the coil 11a is operated by a power supply voltage Vcc from a power supply 20, and supplies the coil 11a with drive current Id. An amplitude control unit 40, connected to the coil 11a, detects the amplitude of the movable element 12 from the induced voltage generated at the coil 11a and monitors temporal changes in the amplitude to detect an abnormality. The amplitude control unit 40 detects an abnormality by detecting a temporal change in load corresponding to a temporal change in the amplitude. The amplitude control unit 40 feeds back the detected amplification information to a control output unit 50.

The control output unit 50 controls the drive current Id supplied to the coil 11a based on the amplification information from the amplitude control unit 40. In the illustrated example, the control output unit 50 generates a PWM signal used for pulse width modulation (PWM) of the drive current Id based on the amplification information, and outputs the PWM signal to the drive circuit 30. The control output unit 50 generates the PWM signal so that the coil 11a is supplied with drive current Id having a frequency synchronized with a mechanical resonance frequency of the linear oscillation actuator 10 that is determined by the weight of the movable element 12, the spring constant of the spring 14, and the like. A constant voltage power supply 21, which is connected to the control output unit 50, generates a constant voltage based on the power supply voltage Vcc from the power supply 20, and supplies the control output unit 50 with the constant voltage as operational voltage.

When the drive current Id, which is controlled as described above, flows to the coil 11a, the permanent magnet 12a of the movable element 12 is driven in the reciprocation direction (sideward direction as viewed in the drawing) by flexing the spring 14 in accordance with the direction the drive current ID flows. The flow direction of the drive current Id is switched at proper timings under the control of the control output unit 50 to reciprocate the movable element 12.

Figure 2:
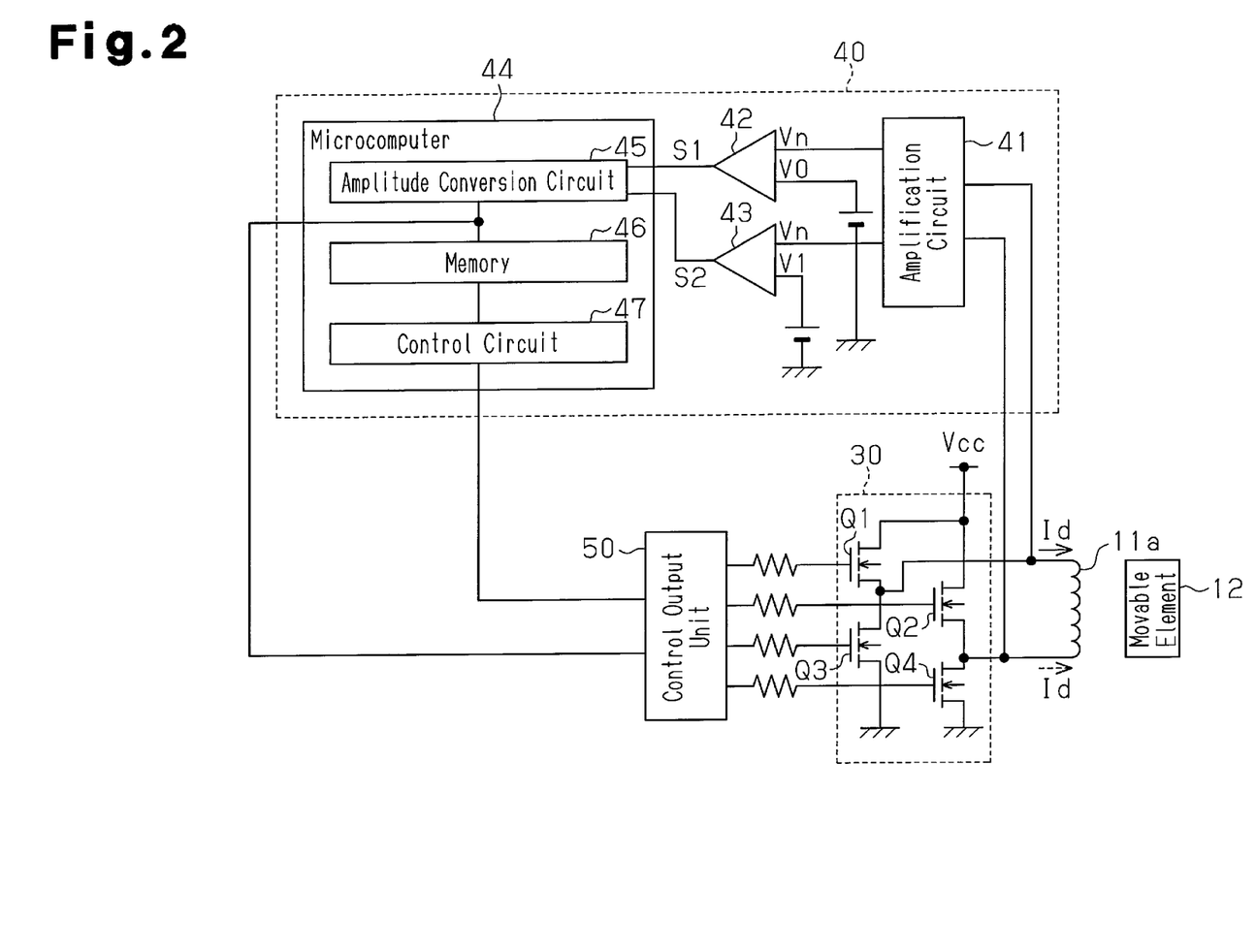
FIG. 2 is a block diagram of a drive circuit and an amplitude control unit.

Referring to FIG. 2, an example of the internal configuration of the drive circuit 30 and the amplitude control unit 40 will now be described.

The drive circuit 30 is a full bridge circuit including switching elements Q1 to Q4, such as MOSFETs. The coil 11a is connected between a connection point of the switching elements Q1 and Q3 and a connection point of the switching elements Q2 and Q4. The pair of the switching elements Q1 and Q4 and the pair of the switching elements Q2 and Q3 are alternately activated by the PWM signal from the control output unit 50 to switch the direction in which the drive current Id flows through the coil 11a. In this manner, the drive circuit 30 controls the drive current Id and reciprocates the movable element 12.

An amplification circuit 41 amplifies the voltage between the two terminals of the coil 11a, that is, the induced voltage generated at the coil 11a, and outputs the amplified voltage Vn to comparison circuits 42 and 43. The comparison circuit 42 compares, for example, a reference voltage V0, which is a zero voltage, and the amplified voltage Vn. Then, the comparison circuit 42 sends an output signal S1, which has a signal level corresponding to the comparison result, to an amplitude conversion circuit 45. Further, the comparison circuit 43 compares a reference voltage V1, which is lower than the reference voltage V0 by a predetermined voltage, and the amplified voltage Vn. Then, the comparison circuit 43 sends an output signal S2, which has a signal level corresponding to the comparison result, to the amplitude conversion circuit 45. The reference voltage V1 is set to a voltage that is higher by a predetermined voltage than the reference voltage V0.

A microcontroller 44 includes the amplitude conversion circuit 45, which detects the amplitude of the movable element 12, a memory 46, which stores the amplitude of the movable element 12 detected by the amplitude conversion circuit 45, and a control circuit 47, which determines a change of a load corresponding to a temporal change in the amplitude stored in the memory 46.

Figure 3:
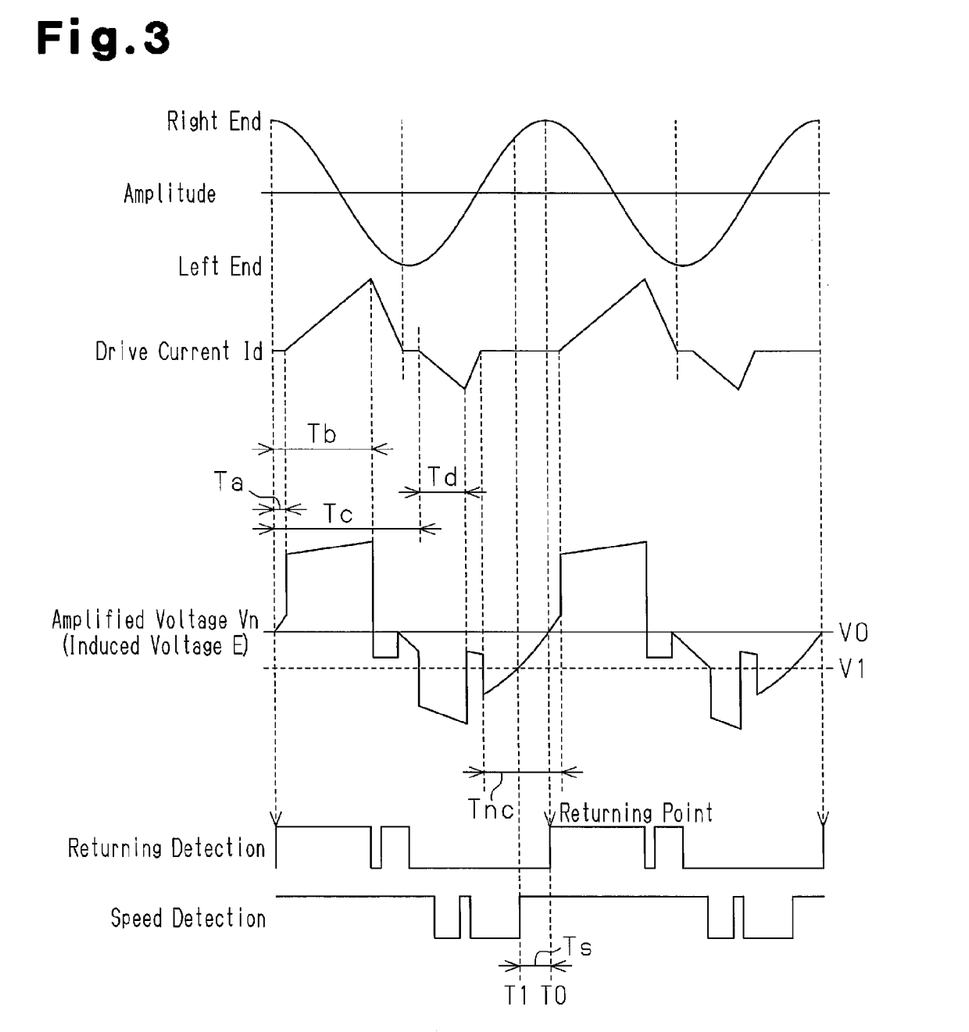
FIG. 3 is a timing chart illustrating amplitude detection.
Figure 4:
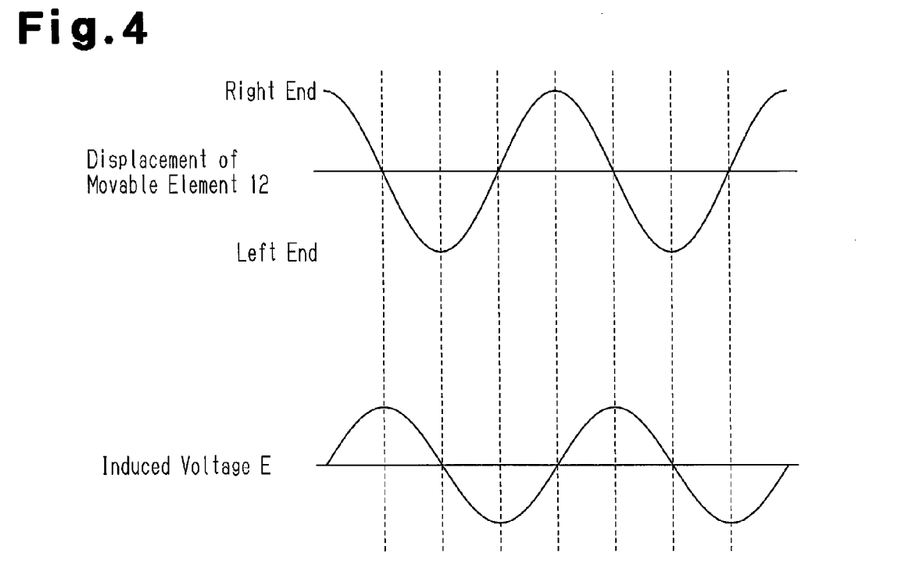
FIG. 4 is a timing chart illustrating amplitude detection.

Referring to FIG. 3, based on the signal level of the output signal S1 from the comparison circuit 42, the amplitude conversion circuit 45 detects the time T0 at which the amplified voltage Vn becomes the same as the reference voltage V0 (e.g., 0 v) and determines that time T0 is the returning point of the reciprocation of the movable element 12. In further detail, referring to FIG. 4, an induced voltage E having a sinusoidal wave is generated in correspondence with the reciprocation of the movable element 12. The waveform of the induced voltage E has the same frequency as a mechanical resonance frequency of the linear oscillation actuator 10. The induced voltage E is varied in correspondence with the amplitude, displacement, speed of the oscillation (reciprocation), acceleration of the oscillation, direction of the oscillation, and the like of the movable element 12. The induced voltage E increases as the speed of the movable element 12 increases. For example, when the movable element 12 reaches one reciprocation end (right end or left end), the speed of the movable element 12 is zero. Here, the movement of the permanent magnet 12a in the movable element 12 is temporarily stopped, and the magnetic flux does not vary. Thus, the induced voltage E becomes zero. This allows the amplitude conversion circuit 45 to determine that the time when the induced voltage E (amplified voltage Vn) becomes a zero voltage is the returning point at which the movable element 12 switches oscillation directions.

Further, referring to FIG. 3, based on the signal level of the output signal S2 from the comparison circuit 43, the amplitude conversion circuit 45 detects the time T1 at which the amplified voltage Vn becomes the same as the reference voltage V1. In addition, the amplitude conversion circuit 45 detects the time difference Ts from time T1 to time T0 and obtains the speed (amplitude) of the movable element 12 from the time difference Ts. More specifically, the amplitude conversion circuit 45 measures the time (time difference Ts) from when the induced voltage E becomes a predetermined voltage (reference voltage V1) to when the reciprocation returns (time T0). Then, the amplitude conversion circuit 45 converts the time difference Ts to amplitude. In detail, the linear oscillation actuator 10 oscillates at a constant frequency, and the position and speed of the movable element 12 varies in conformance with the sine curve. Accordingly, measurement of the time difference Ts allows for a sine curve representing the drive state of the linear oscillation actuator 10 to be specified, and the speed (amplitude) of the movable element 12 to be specified.

Figure 5:
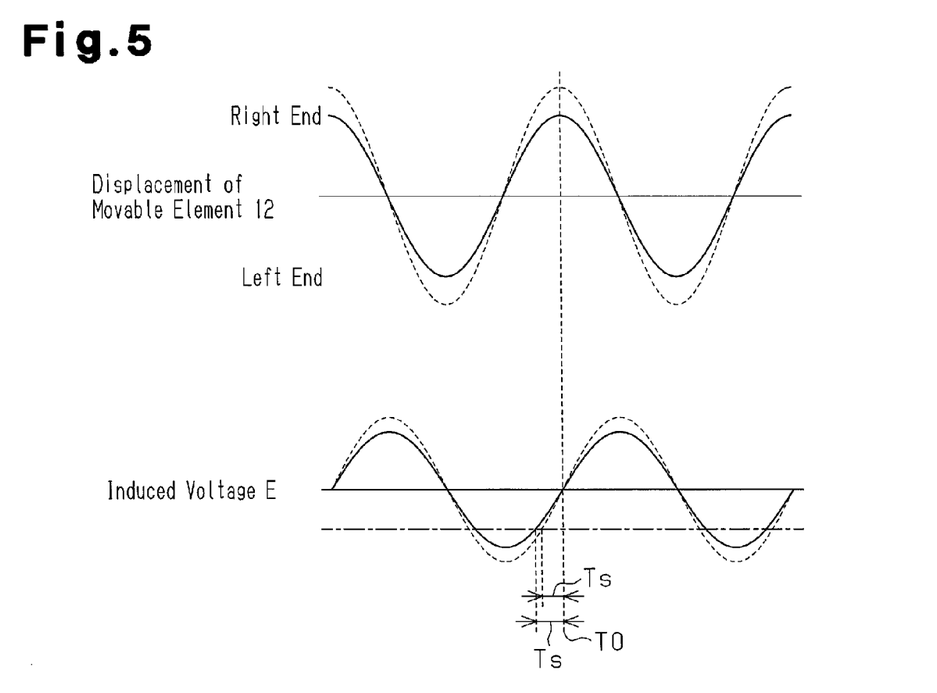
FIG. 5 is a timing chart illustrating amplitude detection.

An example for converting a time difference T to amplitude will now be described. The induced voltage of the coil 11a is determined from electromagnetic force, amplitude, and frequency. Here, a change in the induced voltage E is caused by only the amplitude of the movable element 12. Thus, an increase in the amplitude increases the induced voltage E. For example, as shown in FIG. 5, a large amplitude of the movable element 12 shortens the time difference Ts (refer to broken line curve). On the other hand, a small amplitude of the movable element 12 prolongs the time difference Ts (refer to solid line curve). This allows for conversion of the time difference Ts to amplitude.

When the reference voltage V1 is set at a voltage higher by a predetermined voltage than the reference voltage V0, the amplitude may be obtained by detecting the time difference Ts from time T0 when the amplified voltage Vn becomes the same as the reference voltage V0 to time T1 when the amplified voltage Vn becomes the same as the reference voltage V0.

Referring to FIG. 3, such an amplification detection is performed in a non-conductive period Tnc during which the drive current ID does not flow to the coil 11a. The non-conductance period Tnc is obtained, for example, by performing PWM control on the output of the drive current Id to the coil 11a and limiting the maximum output width of the PWM output. Alternatively, PWM control may be performed on the output of the drive current Id to the coil 11a when the movable element 12 is driven in one direction, and the output may be fixed when the movable element 12 is driven in the other direction. In this case, the remaining time after the fixed output is set as the non-conductive period.

In the example of FIG. 3, the amplitude detection is performed at the returning point for only one direction (returning point at right end). However, the amplitude detection may be performed at the returning points for both directions (returning points at right end and left end).

The amplitude conversion circuit shown in FIG. 2 outputs the detected amplitude of the movable element 12 to a memory 46 and a control output unit 50. The amplitude of the movable element 12 sequentially stored in the memory 46 indicates temporal amplitude changes. The control circuit 47 detects temporal load changes in correspondence with the temporal changes of the amplitude of the movable element 12 stored in the memory 46, and detects an abnormality from the detection result. Further, the control circuit 47 determines the likeliness in which a momentary change of the load occurs in correspondence with a temporal change in the amplitude of the movable element 12.

The control output unit 50 generates a PWM signal to control the output timing of the drive current Id in conformance with the returning timing of the reciprocation detected by the amplitude conversion circuit 45. More specifically, as shown in FIG. 3, the control output unit 50 activates the switching elements Q1 and Q4 for a predetermined period Tb after a predetermined period Ta from the returning point of the reciprocation, and supplies the coil 11a with the drive current Id in a first direction. The control output unit 50 also activates the switching elements Q2 and Q3 during a predetermined period Td after a predetermined time Tc (Tc>Ta+Tb) from the returning point of the reciprocation, and supplies the coil 11a with the drive direction Id in the direction opposite to the first direction.

Further, based on the amplitude information from the amplitude conversion circuit 45, the control output unit 50 generates the PWM signal so that the amplitude of the movable element 12 conforms to a target value. For example, the control output unit 50 controls a current amount of the drive current Id so that the amplitude of the movable element 12 conforms to the target value. More specifically, the control output unit 50 controls the current amount of the drive current Id by controlling the lengths of the predetermined periods Tb and Td (conductive periods), namely, the duty ratio, so that the amplitude of the movable element 12 conforms to the target value.

Figure 6:
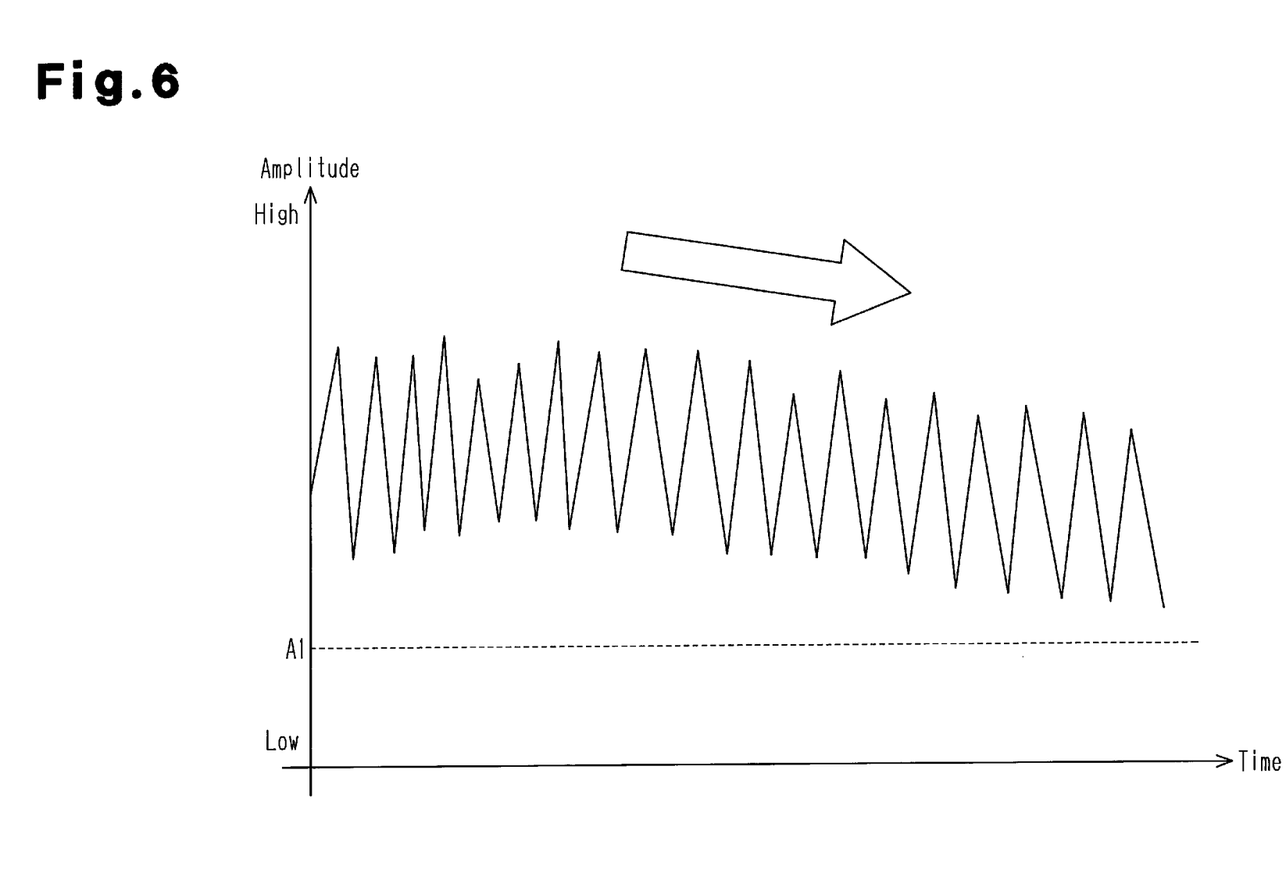
FIG. 6 is a waveform chart illustrating the operation of a control circuit.
Figure 7:
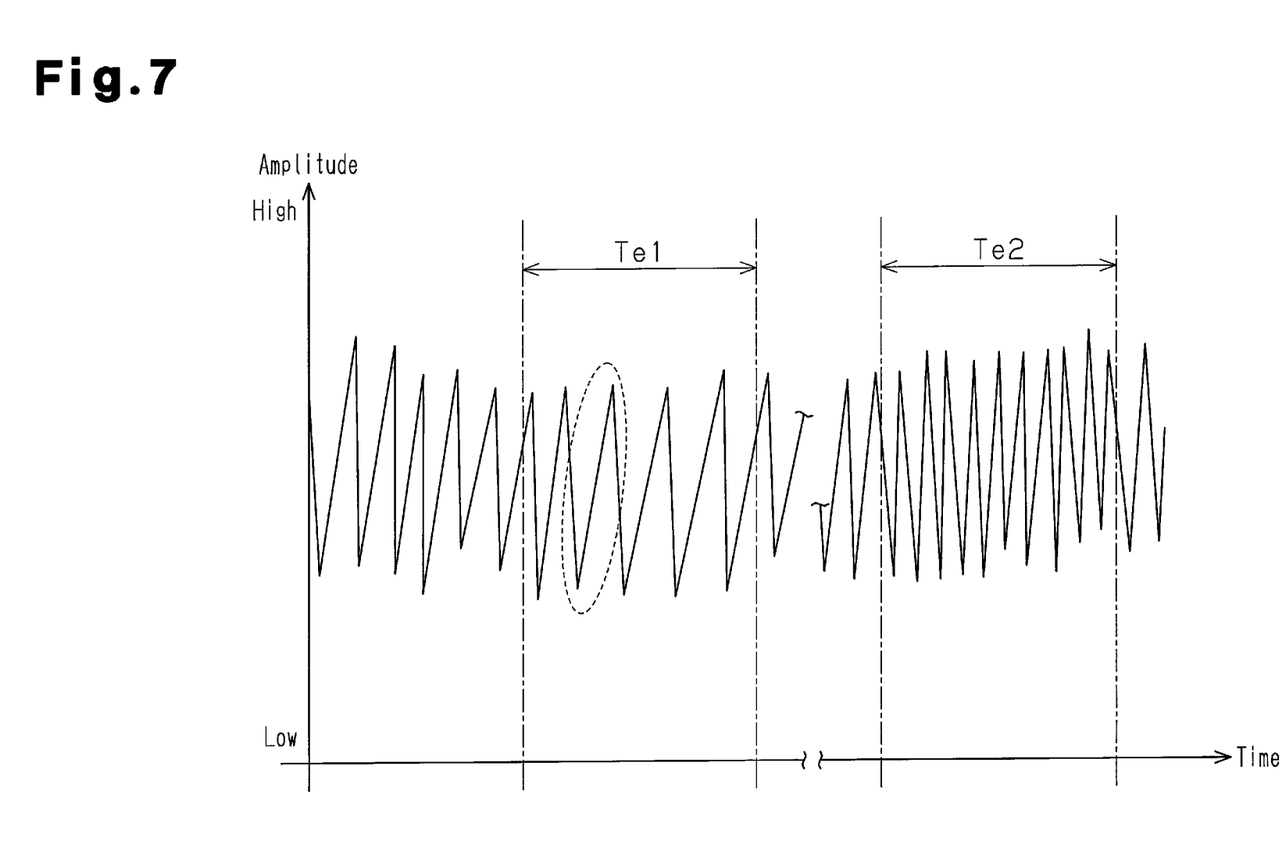
FIG. 7 is a waveform chart illustrating the operation of the control circuit.

The operation of the linear oscillation actuator 10 (in particular, the control circuit 47) will now be described with reference to FIGS. 6 and 7.

The movable element 12 of the linear oscillation actuator 10 is reciprocated by the drive current Id supplied from the drive circuit 30. The amplitude of the movable element 12 is detected at each returning point, and the amplitude is stored in the memory 46. As shown in FIGS. 6 and 7, the amplitudes stored in the memory 46 are plotted along a time axis to detect temporal amplitude changes (e.g., increase gradient and decrease gradient). The increase and decrease of the amplitude when maintaining constant the power supply voltage Vcc of the power supply 20, which drives the linear oscillation actuator 10, is mainly caused by increases and decreases in the load. For example, when the driving of the movable element 12 oscillates a load portion and a foreign matter such as a smear or dust collects on the load portion, the foreign matter becomes a resistance that lowers the amplitude of the movable element 12. Thus, by detecting an increase and decrease in the amplitude of the movable element 12, an increase and decrease in the load may be virtually detected.

The control circuit 47 detects a tendency in temporal changes of the movable element 12 to detect a tendency in temporal changes of the load. In the example of FIG. 6, momentary increases and decreases in the amplitude of the movable element 12 are repeated to gradually decrease temporal changes. In this case, the control circuit 47 may detect a gradual decreasing tendency (decease tendency: refer to arrow) of the movable element 12 as time advances. This allows for the control circuit 47 to detect a tendency of temporal changes in the load (increase tendency). Thus, early driving changes may be detected. As a result, when an abnormality occurs, a measure may be taken at an early stage, such as the indication of a warning and the stopping of the drive.

When detecting an abnormality with, for example, a momentary value, an abnormality may first be detected if the amplitude becomes lower than an abnormality value A1, which is set taking into consideration component variations and the like. In comparison, when detecting an abnormality based on temporal changes of the amplitude, a tendency in temporal changes of the load may be detected. This allows for an abnormality to be detected before the amplitude becomes lower than the abnormality value A1. Accordingly, an abnormality may be detected at a stage earlier than when detecting an abnormality with a momentary value, and with a high accuracy.

Further, the control circuit 47 counts the number of times the amplitude increases and decreases within a predetermined period to determine whether or not the load is apt to change momentarily. For example, as shown in FIG. 7, when the number of times the amplitude increases and decreases within a predetermined period Te1 is small, the control circuit 47 determines that a load change is unlikely to occur. In this case, when controlling the drive current Id, the control circuit 47 controls the control output unit 50 or the like so that feedback control having high stability may be performed. For example, the control circuit 47 makes changes to decrease the loop gain of a feedback loop that controls the drive current Id based on amplification information detected by the amplitude conversion circuit 45.

When the number of times the amplitude increases and decreases within a predetermined period Te2 is high, the control circuit 47 determines that a load change is apt to occur. In this case, when controlling the drive current Id, the control circuit 47 controls the control output unit 50 or the like to improve the response to load changes. For example, the control circuit 47 makes changes to increase the loop gain of a feedback loop that controls the drive current Id.

The present embodiment described above has the advantages described below.

(1) Temporal changes in the load are detected based on temporal changes in the amplitude. This allows a temporal change tendency of the load to be detected, and driving changes to be detected at an earlier stage than when detecting an abnormality with a momentary value. Thus, a measure may be taken against the abnormality at an early stage, such as the stopping of the drive.

(2) The likeliness of a momentary load change to occur is based on the number of times the amplification is increased and decreased, and the control method (e.g., loop gain) of the movable element 12 is changed in accordance with the determination result. This allows a load change condition to be determined through a simple method of counting the number of times the amplitude increases and decreases, and driving that is suitable for the changing condition of the load to be performed.

(3) To detect the drive state (here, the amplitude of the movable element 12) of the linear oscillation actuator 10, the drive current Id flowing through the coil 11$a$ may be detected. However, with this method, an additional means is needed such as obtaining an integral value of a predetermined time to detect current from the pulse discharge required to drive the linear oscillation actuator 10. In contrast, the present embodiment does not detect the drive current Id, and detects the amplitude of the movable element 12 by detecting the induced voltage E generated at the coil. Thus, the above problem does not occur.

Figure 8:
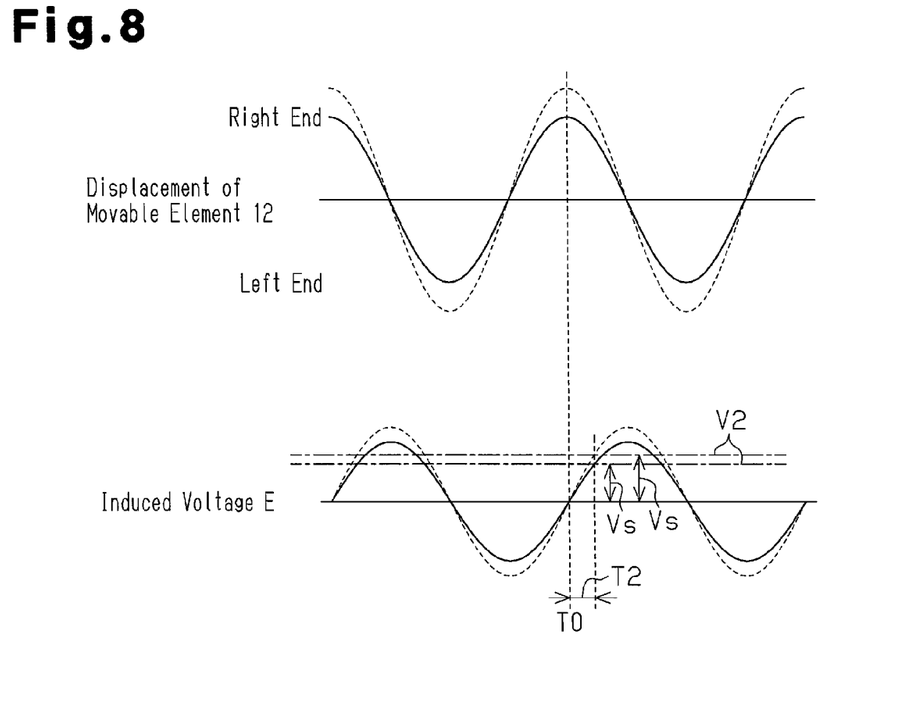
FIG. 8 is a timing chart illustrating amplitude detection.

In the above embodiment, the amplitude of the movable element 12 is detected based on the time difference Ts. Instead, for example, referring to FIGS. 8 and 9, the amplitude of the movable element 12 may be detected based on the voltage difference of the induced voltage in a predetermined period. More specifically, as shown in FIG. 8, a voltage value V2 of the induced voltage V2 is measured after a predetermined period T2 elapses from the returning timing (time T0) of the amplitude, and the voltage difference Vs between the zero voltage and the voltage value V2 is obtained. The voltage difference Vs is converted to amplitude. In further detail, the linear oscillation actuator 10 is oscillated at a constant frequency, and the position and speed of the movable element 12 varies in accordance with a sine curve. Accordingly, measurement of the voltage difference Vs allows for the drive state (sine curve) of the linear oscillation actuator 10 to be specified, and the speed (amplitude) of the movable element 12 to be specified. That is, as shown in FIG. 8, a small voltage difference Vs (refer to solid lines) indicates that the amplitude is small, and a large voltage difference Vs (refer to broken lines) indicates that the amplitude is large.

Figure 9:
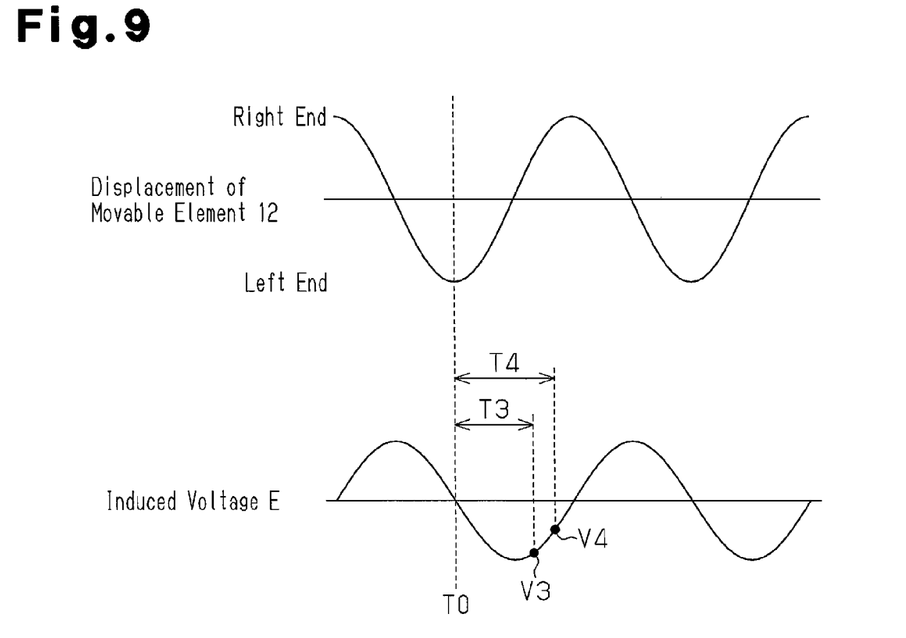
FIG. 9 is a timing chart illustrating amplitude detection.

Further, as shown in FIG. 9, a voltage value V3 of the induced voltage E after a predetermined time T3 elapses from the returning timing (time T0) of the amplitude and a voltage value V4 of the induced voltage E after a predetermined time T4 elapses are measured. The voltage difference between the voltage value V3 and the voltage value V4 is obtained, and the voltage difference is converted to amplitude. When detecting the amplitude in such a manner, for example, the comparison circuits 42 and 43 shown in FIG. 2 may be replaced by analog-digital conversion circuits.

In the above embodiment, the induced voltage E generated at the coil 11$a$ is detected to detect the speed of the movable element 12. Instead, the displacement and acceleration of the movable element 12 that are correlated with the speed may be detected.

Alternatively, an acceleration sensor or the like may be separately provided as a detection means, and the displacement, speed, or acceleration of the movable element 12 may be detected from the sensor output.

The movable element 12 of the above embodiment may include an electromagnet in lieu of the permanent magnet 12$a$. In this case, a stator formed by a permanent magnet may be used in lieu of the stator 11 formed by an electromagnet.

The linear oscillation actuator of the above embodiment may be embodied as a linear oscillation actuator using a movable-stator in which the stator 11 is not completely fixed.

In the above embodiment, the linear oscillation actuator 10 may be installed in an electric razor. In this case, the number of times the amplitude of the movable element 12 increases and decreases and the likeliness of the occurrence of a momentary change of the load of the movable element correspond to the amount of body hair (e.g., whiskers) of a user. In detail, an electric razor, including the linear oscillation actuator, cuts whiskers by sandwiching the whiskers with a fixed outer blade and an inner blade reciprocated by the linear oscillation actuator that is driven by and coupled to the movable element. When a whisker enters the outer blade of such an electric razor, the amplitude of the movable element 12 decreases, and the amplitude increases when the whisker is eliminated (refer to circle in broken lines). The number of times the amplitude increases and decreases corresponds to the number of whiskers entering the outer blade.

Accordingly, the control circuit 47 may count the number of times the movable element 12 increases and decreases to determine the amount of whiskers (density of whiskers) of the user. In this case, based on the determined density of whiskers, the speed of the movable element 12 is changed. More specifically, as indicated by FIG. 7 in period Te1, when the number of times the amplitude increases and decreases during a predetermined period is small, the control circuit 47 determines that the amount of whiskers of the user is small, and makes changes to lower the target value of the amplitude of the movable element 12 and decrease the speed of the movable element 12. On the other hand, as indicated by FIG. 7 in period Te2, when the number of times the amplitude increases and decreases during a predetermined period is large, the control circuit 47 determines that the amount of whiskers of the user is large, and makes changes to raise the target value of the amplitude of the movable element 12 an increase the speed of the movable element 12. This allows for a constant smooth shave regardless of whether or not whiskers are dense, and thereby suppresses irritation of the skin.

Further, in this case, while the frequency of the drive current Id is synchronized with the mechanical resonant frequency of the linear oscillation actuator 10, only the target value of the amplitude is changed to change the control method of the movable element 12. This allows for the shaving properties to be improved, while efficiently driving the movable element.

DESCRIPTION OF REFERENCE CHARACTERS

10: linear oscillation actuator (linear actuator)
11: stator

11a: coil
12: movable element
12a: permanent magnet
40: amplitude control unit
45: amplitude conversion circuit
47: control circuit
50: control output unit

The invention claimed is:

1. A method of driving a linear actuator including a stator and a movable element that reciprocates, wherein one of the stator and the movable element includes an electromagnet, the method comprising:
   detecting induced voltage generated at a coil of the electromagnet during reciprocation of the movable element;
   detecting an amplitude of the reciprocation of the movable element from the induced voltage;
   storing the detected amplitude;
   controlling a drive current for reciprocating the movable element based on at least the detected amplitude; and
   detecting a gradual increasing or decreasing tendency of a load as time advances based on a gradual decreasing or increasing tendency of a series of the detected amplitudes sequentially stored, the load including an external load acting on the movable element from outside the linear actuator when the movable element is reciprocating; and
   detecting an abnormality based on the gradual increasing or decreasing tendency of the load.

2. The method of driving a linear actuator according to claim 1, comprising:
   determining likeliness of a momentary change of the load to occur by detecting a number of times the detected value increases and decreases; and
   changing a method of controlling the movable element in accordance with the determination result.

3. The method of driving a linear actuator according to claim 2, comprising:
   changing, in correspondence with the determination result, a loop gain of a feedback loop that controls the drive current.

4. The method of driving a linear actuator according to claim 2, comprising:
   changing a target value of an amplitude of the movable element in correspondence with the determination result.

5. The method of driving a linear actuator according to claim 1, comprising:
   during a non-conductive period in which the drive current is not flowing to a coil of the electromagnet included in one of the stator and the movable element, detecting induced voltage generated at the coil during reciprocation of the movable element to detect the detected value.

* * * * *